United States Patent
Shah (10) Patent No.: US 8,545,121 B2
(45) Date of Patent: Oct. 1, 2013

(54) DISPENSING MECHANISM ASSEMBLY

(75) Inventor: Arvind N. Shah, Suffern, NY (US)

(73) Assignee: Avon Products, Inc., New York, NY (US)

( * ) Notice: Subject to any disclaimer, the term of this patent is extended or adjusted under 35 U.S.C. 154(b) by 103 days.

(21) Appl. No.: 13/287,464

(22) Filed: Nov. 2, 2011

(65) Prior Publication Data

US 2013/0108353 A1     May 2, 2013

(51) Int. Cl.
- *B05C 17/01* (2006.01)
- *B65B 1/04* (2006.01)
- *B65B 3/04* (2006.01)
- *B65B 31/00* (2006.01)

(52) U.S. Cl.
USPC ........... 401/265; 401/150; 401/171; 401/173; 401/174; 401/175; 222/387; 222/390; 222/397; 141/4; 141/113

(58) Field of Classification Search
USPC ............... 401/150, 171, 172, 173, 174, 175; 222/387, 390, 397; 141/4, 6, 59, 113
See application file for complete search history.

(56) References Cited

U.S. PATENT DOCUMENTS

| | | | | |
|---|---|---|---|---|
| 2,095,187 A * | 10/1937 | Grandbouche | ............... | 222/387 |
| 4,421,433 A * | 12/1983 | Villanueva | .................... | 401/175 |
| 4,892,231 A * | 1/1990 | Ball | .............................. | 222/207 |
| 5,346,324 A * | 9/1994 | Kuo | .............................. | 401/146 |
| 5,909,977 A * | 6/1999 | Kuo | .............................. | 401/146 |
| 2005/0242127 A1 | 11/2005 | Bougamont et al. | | |
| 2008/0061084 A1 | 3/2008 | Prague et al. | | |
| 2009/0154984 A1 | 6/2009 | Tani | | |

* cited by examiner

*Primary Examiner* — David Walczak
*Assistant Examiner* — Joshua Wiljanen
(74) *Attorney, Agent, or Firm* — David M. Joyal; Joan M. McGillycuddy

(57) ABSTRACT

A dispensing apparatus is provided, which, when filled with product and assembled, substantially reduces product leakage from an orifice of an applicator thereof during extended periods of non-use. The dispensing apparatus includes a barrel defining an interior chamber for holding a product, the barrel having an open bottom at one end thereof and an applicator tip having one or more orifices therethrough at the other end. The barrel also includes two or more passages located along the length of the barrel between the bottom of the barrel and a predetermined fill-level.

9 Claims, 5 Drawing Sheets

DISPENSING MECHANISM ASSEMBLY

FIELD OF INVENTION

The present invention relates generally to a dispensing apparatus. More particularly, the present invention relates to a dispensing apparatus that reduces and/or substantially prevents product oozing between uses.

BACKGROUND OF THE INVENTION

Many devices exist for dispensing cosmetics, medicinal, household, food, and other types of products. Such dispensing apparatuses usually consist of a solid or flexible housing having an interior chamber for holding a product, an applicator having an orifice for applying the product, and a delivery mechanism for dispensing the product through the orifice of the applicator. For example, in the cosmetics and personal care industries, a dispensing apparatus may be used to apply lipstick, lip balm, skin creams, lotions, and other cosmetic products to portions of the face and body.

Before being sold to consumers, a dispensing apparatus is filled with a product and assembled. The housing may be bottom-filled with product, such as through a hole or opening in the bottom. Once filled, a dispensing mechanism may be inserted into the housing to seal the bottom of the housing, preventing product from escaping therefrom. During this process, air may become trapped in the interior chamber of the housing between the dispensing mechanism and the product. Unfortunately, such air is pressurized as compared to the atmosphere, causing the product to ooze or leak out of the applicator when not in use. This is very undesirable to users, as the product may escape onto users' hands and/or personal belongings.

There is a continuing need in the art for improved dispensing apparatuses that prevent or substantially minimize product oozing. It is therefore an object of the invention to provide a dispenser that, when assembled, substantially reduces residual air from remaining in the interior chamber as compared to conventional dispensers. It is a further object of the invention to modify conventional dispensing apparatuses to prevent oozing at minimal cost.

SUMMARY OF THE INVENTION

In accordance with the foregoing objectives and others, the present invention provides a dispensing apparatus which, when filled with product and assembled, substantially reduces product leakage during extended periods of non-use.

In one aspect of the invention, a dispensing apparatus for dispensing a flowable product is provided. The dispensing apparatus includes a barrel defining an interior chamber for holding a flowable product. The barrel has an open bottom at one end thereof and an applicator tip having one or more orifices therethrough at the other end, the applicator tip typically including a peelable seal to enable filling and prevent leakage/oozing prior to the initial use. The peelable seal is removed by the user before the first use. The barrel is configured to permit passage of air from the interior of the chamber to the exterior of the chamber at a first position substantially abutting a predetermined fill-level and at a second position between the first position and the open bottom of the barrel also configured to permit passage of air from the interior to the exterior of the chamber.

The dispensing apparatus also includes a dispensing mechanism disposed within the interior of the barrel between the open bottom and the fill-level. Typically, the dispensing mechanism engages with the interior walls of the barrel to create a liquid-tight seal such that a product disposed in the barrel is prevented from exiting the open bottom.

When the barrel is filled with product and a dispensing mechanism is inserted into the barrel, an amount of air trapped between the dispensing mechanism and the product may be forced through the passages of the barrel at the first and/or second position. This may substantially lower the pressure in the interior chamber of the barrel, as compared to an otherwise identical dispensing apparatus having one or no passages. Accordingly, the product is prevented or inhibited from being discharged through the one or more applicator orifices in the absence of actuation of the dispensing mechanism.

These and other aspects of the invention will become apparent to those skilled in the art after a reading of the following detailed description of the invention, including the figures and appended claims.

BRIEF DESCRIPTION OF THE FIGURES

The preferred embodiments of the present invention are illustrated by way of example and are not limited to the following figures.

DETAILED DESCRIPTION

All terms used herein are intended to have their ordinary meaning in the art unless otherwise provided.

The materials to be dispensed are not particularly limited and include cosmetics and adhesives, to name a few, and may be in the form of suspensions, emulsions, liquids, and the like. The materials include very viscous materials, including non-Newtonian liquids having very high initial viscosities, as well as semi-solids, gels and other materials capable of being dispensed from an applicator. Particular mention may be made of cosmetics, including, without limitation, lip gloss and other liquids that are flowable at room and/or skin temperature. Although the viscosity of the composition is not limited per se, the inventive dispensers are most useful with compositions that have a viscosity preferably ranging, for example, from about 5,000 cps to about 500,000 cps, more preferably ranging from about 10,000 cps to about 50,000 cps, and most preferably about 20,000 cps. Without intending to be limited, it is believed that the advantages of the present invention will be most fully realized when the cosmetic formulations are pseudoplastic or thixotropic, or otherwise have high viscosities at room temperature (e.g., greater than about 5,000 cps).

Specific examples of materials may include adhesive gels, bleaching agents, stain removers, fabric softeners, fragrances, bleaching agents, antibiotic solutions, pain relieving cream, antibiotic cream and analgesic cream, teeth whitening and teeth lamination solutions/gels, hair treatment serums/creams, scalp hydrating oils, caulk, anti-dandruff cream, skin treatment cream, concealer, hydrating cream, gel and cream make-up remover, hair styling products, temporary hair colors, sunscreen, moisturizer, lip plumping gel/cream, cheek plumping gel/cream, and cheek blush.

Figure 1:
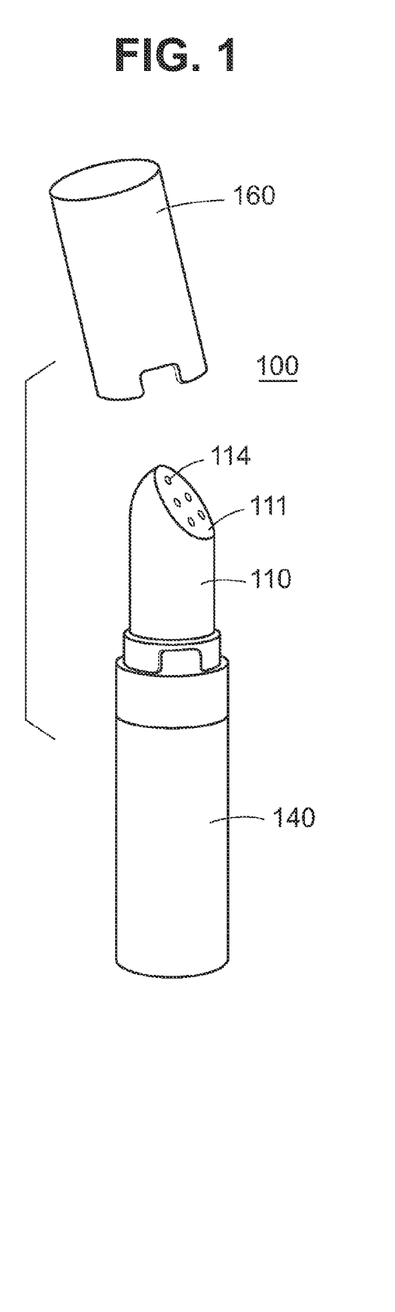
FIG. 1 illustrates an exemplary embodiment of a dispenser.
Figure 2:
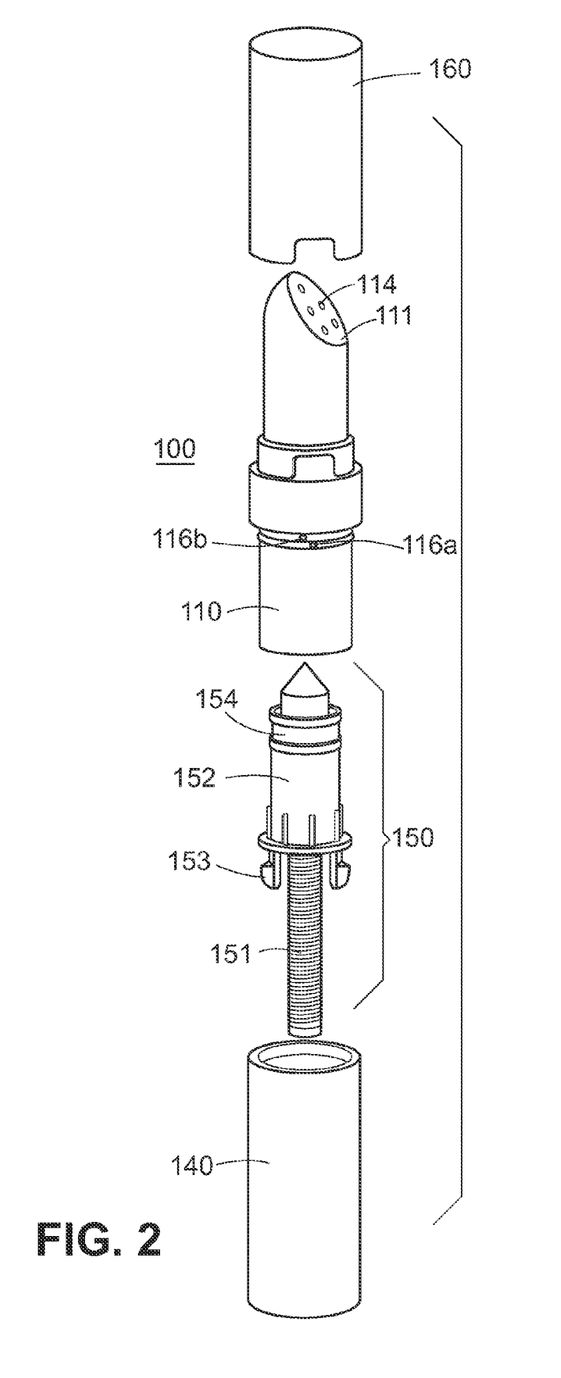
FIG. 2 shows an exploded view of the dispenser of FIG. 1.

Referring to FIG. 1, an exemplary dispensing apparatus ("dispenser") 100 is illustrated. As shown, the dispenser comprises a barrel 110, a cap 160, and an actuator 140. As described in detail below, the barrel 110 comprises a housing defining an interior chamber to accommodate a product and a dispensing mechanism assembly (FIG. 2 at 150). The barrel 110 is adapted such that the cap 160 may be attached to the exterior surface thereof near the top. Moreover, the barrel 110 is adapted to be partially disposed within the interior of the actuator 140.

In the illustrated embodiment, the barrel 110 may be filled with a cosmetic product, in particular a semi-solid lip gloss. Once the cap 160 is removed, a user may twist or turn the actuator 140 to force the product through one or more orifices 114 in a top portion of the barrel (i.e., an applicator 111). The applicator 111 may then be used to evenly coat the lips with the product.

When finished applying the product, a user may lock the cap 160 onto the barrel 110 to prevent any residual product from escaping the package. The cap 160 is preferably sized to fit over a portion of the barrel 110 and is capable of reversibly engaging a neck portion thereof using any suitable reversible connector mechanism. In one embodiment, the neck portion of the barrel 110 includes a notch and the cap 160 portion may include a corresponding depression for engaging the notch. In another embodiment, the neck portion and the cap 160 have complementary threading.

The dispenser 100, including the barrel 110, the actuator 140, and the cap 160, may be made from plastic, metal, and/or thermoplastic elastomers, manufactured using injection and/or injection blow molding, and assembled by snap-fit assembly. However, it is contemplated that any other material, manufacturing, and/or assembly method may also be used. In particular, the cap 160 and the actuator 140 may be made with anodized plastic materials to provide a metallic look.

One specific dispenser worth noting is that described in U.S. Patent App. Pub. No. 2011/0064511, titled "Dispensing Mechanism Assembly," incorporated herein by reference in its entirety.

Referring to FIG. 2, an exploded view of the dispenser 100 of FIG. 1 is illustrated. The dispenser 100 is shown to include a barrel 110, a dispensing mechanism 150, a cap 160 and an actuator 140. The barrel 110 is shown to include a top aperture 116b and bottom aperture 116a, the details of which are discussed with reference to FIGS. 4A through 4D.

The barrel 110 comprises an applicator 111 at its most distal end, which is shown to be cylindrical in shape with a slightly domed top and a flat face. The exact form of the applicator 111 depends on the use of the product, and may comprise any number of orifices 114 through which the product may be dispensed. The applicator 111 may be of the same material as the rest of the barrel 110, or may comprise a different material. In any event, the applicator 111 may comprise any material and configuration capable of holding a charge of product and transferring it to the desired surface, such as a human integument, including keratin fibers (hair, eyelashes, etc.), nails, lips, skin, or the like. The applicator 111 may, for instance, include a brush, a foam pad, a flocked surface, a comb, a plastic spatula, or any other surface which can hold and deliver the product as desired.

The exact dispensing mechanism 150 is also not particularly important, and may be a push type or screw type mechanism that is either a propel or propel/repel mechanism. Generally, the dispensing mechanism 150 will comprise a piston 154, which is to be disposed in the interior chamber of the barrel 110. The piston 154 may be pushed or otherwise forced from the bottom end of the barrel 110 toward the applicator 111, which causes the product disposed within the interior chamber to be expelled through the aperture(s) 114 in the applicator 111. The actuator 140 provides the force to actuate the movement of the piston 154 in the barrel 110. However, the force required to operate the actuator 140 may be applied manually, pneumatically, hydraulically or through various other types of displacement mechanisms.

In the illustrated embodiment, the dispensing mechanism 150 is a screw-type propel mechanism, where the actuator 140 is rotatably connected to a rod 151 and piston 154 assembly. A threaded rod 151, screw 152, and piston 154 are arranged within the actuator 140 such that the rotational movement of the rod is restricted with respect to the actuator and is axially displaceable with respect to the screw. Accordingly, the actuator 140, when actuated (e.g. rotated), causes the threaded rod 151 to rise up on the screw 152, which causes the piston 154 to push the product upwards in the inner chamber of the barrel 110 towards the applicator 111. [Although the piston 154 is shown as having a point, it can be flat, rounded, etc.]

The screw 152 has a generally cylindrical shape and includes a number of projections 153 extending from a bottom edge (e.g., lugs). Although not shown, the inner periphery of the screw 152 comprises threads for engaging with the rod 151. The projections 153 may be complimentary to projections (not shown) within the inner surface of the actuator 140 to provide resistance to rotation of the actuator. In another embodiment, a ratchet and spring may provide resistance to rotation of the actuator, rather than projections 153.

Figure 3:
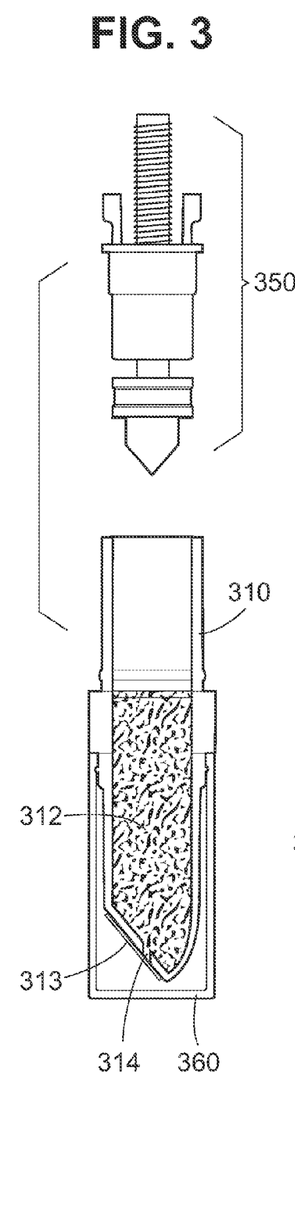
FIGS. 3, 3A, and 3B illustrate exploded views of an exemplary dispensing mechanism 350 and product-filled barrel 310, wherein the dispensing mechanism may be inserted into the bottom of the barrel to prevent leakage of the product.

Referring to FIG. 3, an exploded, cut-away view of an exemplary dispensing mechanism 350 and barrel 310 are shown, wherein the barrel is filled with product 312.

During a typical manufacturing process, the barrel 310 is inserted into the cap 360 and filled with product 312 in an upside-down configuration (i.e., with the cap facing downward). Because the applicator 311 comprises one or more apertures 314, it is generally covered with a peelable sticker 313 or other sealing means during the filling process to prevent product leakage. The peelable sticker 313 creates an air-tight and/or liquid-tight seal with the applicator 311. In an alternative embodiment, the cap 360 may be used as a sealing means to create an air-tight and/or liquid-tight seal with the applicator 311 without the need for a sticker 313.

As shown, the barrel 310 is tilled with product 312 in such a way as to leave some unfilled space 315 toward the bottom opening of the barrel (i.e., between the product and open bottom of the barrel). The dispensing mechanism 350 may then be inserted into the barrel 310, creating a seal between the inner walls of the barrel and the dispensing mechanism, such that leakage of product 312 out of the bottom of the barrel is prevented. It will be appreciated that, although the seal is typically liquid-tight, the seal may also be air-tight, or substantially air-tight.

Figure 3A:
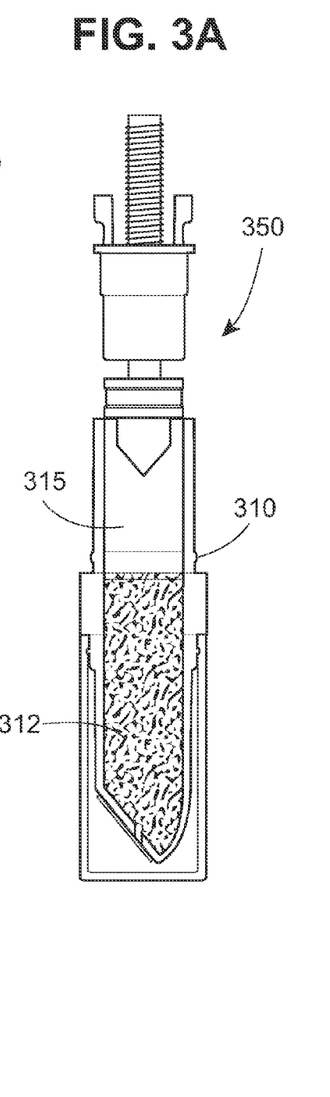

Referring to FIG. 3A, the unfilled space 315 between the product 312 and bottom opening of the barrel 310 typically comprises an amount of air at atmospheric pressure. Unfortunately, as the dispensing mechanism 350 is inserted into the bottom of the barrel 310, the air in the unfilled space 315 remains trapped in the barrel. This air may become compressed as the dispensing mechanism 350 is pushed further into the barrel 310, especially if a substantially air tight seal is created between the dispensing mechanism and the inner walls of the barrel.

Figure 3B:
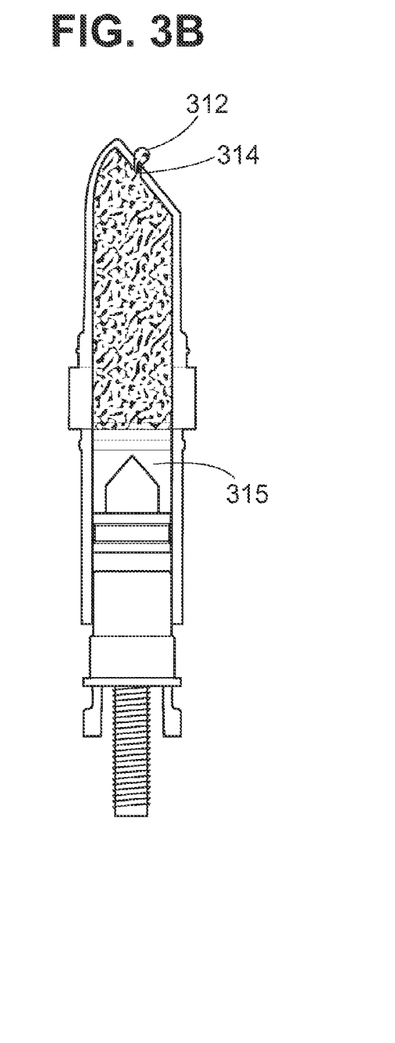

Referring to FIG. 3B, the dispensing mechanism 350 is illustrated as being disposed within the product-filled barrel 310. As shown, the unfilled space 315 within the barrel between the dispensing mechanism and the product is substantially reduced. Assuming the amount of air in the unfilled space 315 remains substantially constant (i.e., there is minimal leakage between the dispensing mechanism 350 and the inner walls of the barrel 310, the pressure in the barrel 310 due to the entrapped air will increase, and may be approximated according to the following equation:

$$P = \frac{nRT}{V} \quad (1)$$

where:
P=pressure measured in atmospheres
V=volume of the unfilled space
n=amount of substance
R=universal gas constant
T=temperature As shown in the above equation, the pressure in the barrel 310 will increase as long as the absolute change in volume is greater than the amount of air that escapes from the barrel 310. Accordingly, if pressurized air trapped within the barrel 310 causes a sufficient increase in the internal pressure of the barrel, product 312 may be forced through the aperture 314 in the applicator 311 when the sticker is removed.

Referring to FIGS. 4A through 4D, it has surprisingly been found that an amount of air trapped in a barrel 410 during dispenser assembly may be significantly reduced by including two or more apertures (416a, 416b) at a first and second position along the length of the barrel. The two or more apertures (416a, 416b) have been found to allow air to escape upon insertion of a dispensing mechanism (not shown) into the barrel 410. Moreover, it has been found that locating one aperture 416b above the other 416b along a vertical axis of the barrel 410 leads to a significant reduction in barrel pressure of an assembled dispenser, as compared to an otherwise identical dispenser having a barrel with one or no apertures.

Figures 4A, 4B, 4C, 4D:
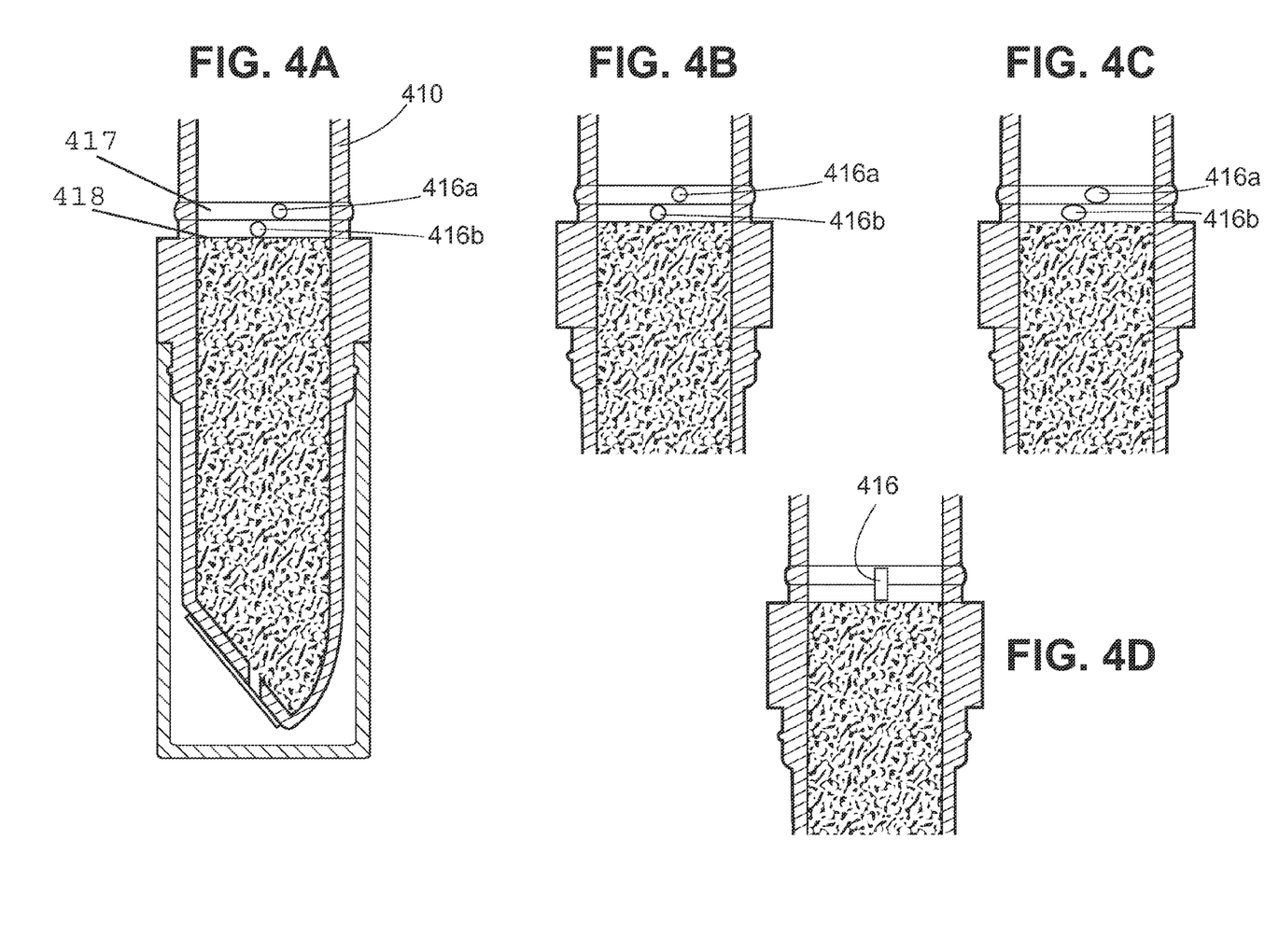
FIG. 4A-4D illustrate cut-away views of exemplary barrels having one or more apertures in the body thereof.

In the illustrated barrel of FIGS. 4A and 4B, the barrel 410 comprises two apertures (416a, 416b) on a front face of the barrel, and two complimentary apertures located on the back side of the barrel. Apertures may be referred to as either top apertures 416b or bottom apertures 416a due to their location on the barrel 410 either closer to the applicator (i.e., the top aperture 416b) or closer to the bottom of the barrel (i.e., the bottom aperture 416a). It will be recognized that a barrel 410 is depicted in FIGS. 4A-4D in an upside-down configuration, which occurs when the barrel is bottom-filled with product. As used herein, the terms "above" and "below" are used in reference to a right-side-up orientation of the barrel, such as when the applicator is pointed toward the sky. Accordingly, the top aperture 416b is described herein as being "above" the bottom aperture 416a.

The top and bottom apertures (416b, 416a) may be located at a first and second vertical position on the barrel 410 between the most bottom point of the barrel (i.e., the open bottom of the barrel) and a point where the product rests when the barrel is full and in an upside-down orientation (i.e., the "fill-level" 418). In other words, although the apertures (416b, 416a) reach from the outside of the barrel 410 to the inner chamber thereof, the product will not leak out of the apertures when the barrel is filled to capacity (i.e., to the fill level 418) in an upside-down position. This is illustrated in FIG. 4A, where the inner chamber of the barrel 410 is full of product, and the apertures (416b, 416a) are located below the fill-level 418.

in one embodiment, the dispenser may include a snap band or snap fit 417 located along the length of the barrel. The snap band 417 typically engages with an actuator (e.g., FIG. 2 at 140) to prevent the same from disengaging with the barrel when the dispenser is hilly assembled. As shown in FIG. 4A, the top aperture 416b may be located between the snap band 417 and the product fill-level 418. For example, the top aperture 416b may be located adjacent to, or abutting, the fill-level 418, the snap band 417, or both the fill-level and the snap band. The bottom aperture 416a is shown to be located on the snap band 417. Although this is a preferred embodiment, the bottom aperture 416a may also be located below the snap band 417.

As shown, the top and bottom apertures (416b, 416a) are located a horizontal distance apart along the circumference of the barrel 410. Typically, this distance is equal to from about 0.1 times the diameter of one of the top aperture 416b to about 3 times the diameter of the top aperture, and most typically the distance is about the size of the diameter of the top aperture. This alignment may be preferable for manufacturing reasons, such as preventing cracking of the barrel 410 between the apertures (416b, 416a), but the invention is not limited to this arrangement of apertures. Thus, in one embodiment, the apertures (416b, 416a) may be aligned on the same vertical axis of the barrel.

The top and bottom apertures (416b, 416a) are also shown to be located a certain vertical distance apart. This distance may be as little as about 0.1 times the diameter of the top aperture 416h, limited only by the manufacturing process employed and the material of the barrel 410. Moreover, the vertical distance may be as much as about 5 times the diameter of the top aperture 416b, limited only by the shape of the barrel 410.

As shown, two sets of top 416b and bottom 416a apertures are located on opposite sides of the barrel 410, approximately 180° around the circumference of the barrel. The two top apertures 416b are located at approximately the same vertical position on the barrel 410 and the two bottom apertures 416a are also located at approximately the same vertical position thereof. It is believed that locating a complimentary set of apertures (i.e., a second set of top and bottom apertures) on the opposite side of the barrel allows for maximum removal of air during manufacture. However, the invention is not so limited, and in certain embodiments, the barrel may include a complimentary set of apertures located from about 1° to about 180< around the circumference of a circular barrel. Of course, if the barrel is non-circular, a complimentary set of apertures may be located on any face of the barrel. Moreover, the barrel 410 may include any number of complimentary sets of top and bottom apertures (416b, 416a), including a complimentary set located on each face of a non-circular barrel or a complimentary set located at approximately equal distances about the circumference of a circular barrel.

in one embodiment, the barrel 410 may include a top and bottom aperture and any number of complementary top apertures 416b or any number of complementary bottom apertures 416a. In another embodiment, the barrel 410 only includes a single set of top 416b and bottom 416a apertures. Moreover, although the top and bottom apertures (416b, 416a) are preferably the same size, this is not a requirement of the invention, and certain exemplary barrels 410 may include a top aperture 416b that is larger or smaller than a bottom aperture 416a.

Referring to FIG. 4C, non-circular top and bottom apertures (416b, 416a) are illustrated. Generally, the top and bottom apertures may be of any shape, including but not limited to enclosed curves or a polygons (e.g., a circle, oval, ellipse, triangle, square, rectangle, pentagon, hexagon, octagon, star, polygon, etc). Moreover, the top aperture 416b and bottom aperture 416a may be the same shape, or may be different shapes.

Referring to FIG. 4D, and alternative embodiment is illustrated wherein the top and bottom apertures are connected into a single, elongated aperture 416. In this embodiment, the barrel 410 comprises two elongated apertures 416, wherein one aperture is on a front face of the barrel and a complementary aperture is located on the back side. As shown, the aperture 416 is in the form of a rectangle having a longer length along the length of the barrel 410 and a shorter length along the circumference of the barrel.

Figure 5A:
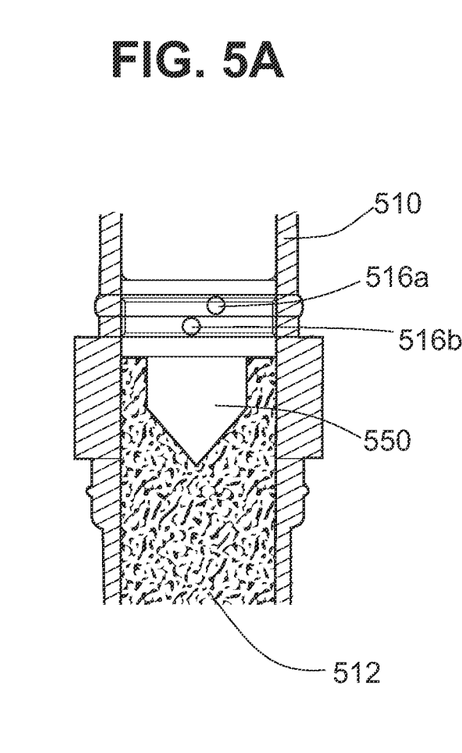
FIGS. 5A and 5B illustrate close-up, cut-away views of a seal between a dispensing mechanism 550 and a barrel 510.

Referring to FIG. 5A, a barrel 510 of an exemplary dispenser is illustrated as having two sets of top and bottom apertures (516b, 516a) included therein and being filled with product 512 to a fill-level. The depicted dispenser is shown in an upside-down configuration, and is fully assembled and ready to be shipped to a customer. As shown, a dispensing mechanism 550 is in contact with the product 512 and prevents the product from traveling farther towards the bottom of the barrel 510. Accordingly, the dispensing mechanism 550 prevents the product 512 from exiting through the top and/or bottom apertures (516b, 516a). Therefore, the apertures (516a, 516b) are located below the seal created between the dispensing mechanism 550 and the inner walls of the barrel 510 when the barrel is filled to the fill-level.

Figure 5B:
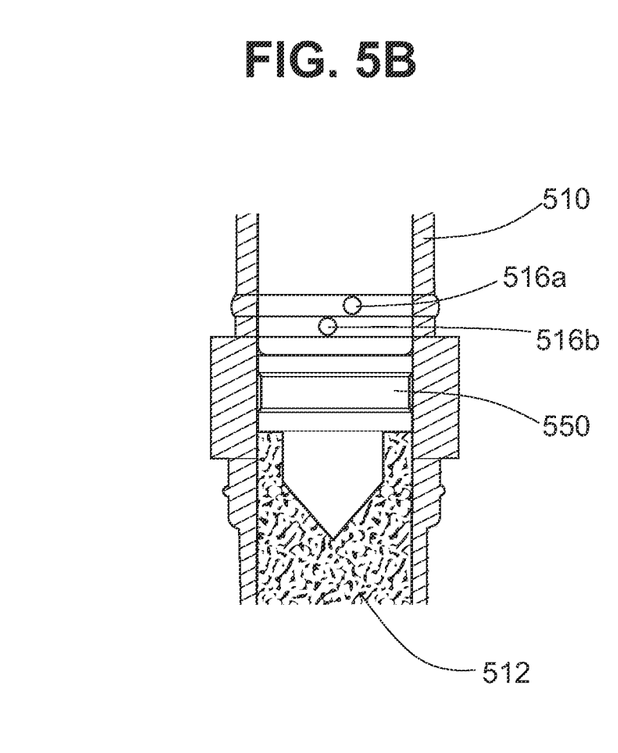

Referring to FIG. 5B, the dispensing mechanism 550 may be pushed farther into the product-filled barrel 510 to dispense the product through an applicator (not shown). Because the dispensing mechanism 550 creates a seal with the inner walls of the barrel 510, any air that enters the barrel through the top and bottom aperture (516b, 516a) will be substantially prevented from entering the product-filled area of the barrel.

Figure 6:
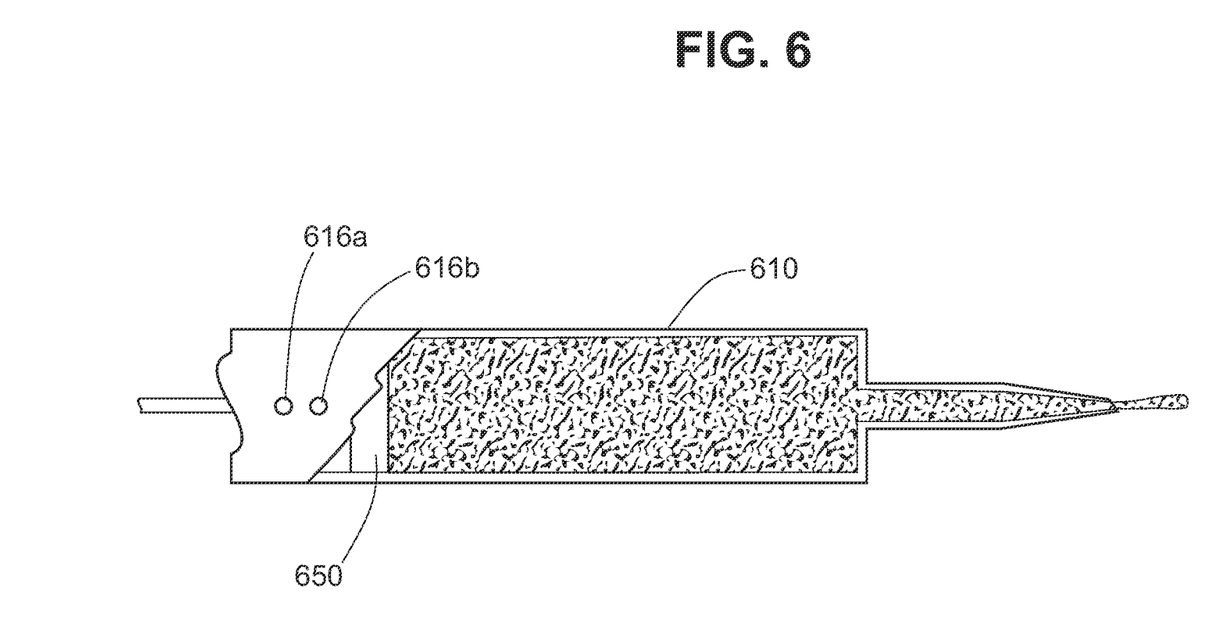
FIG. 6 illustrates an alternative embodiment, wherein the barrel may be filled with a non-cosmetic product, such as but not limited to a caulk or adhesive.

Referring to FIG. 6, an alternative embodiment of a dispenser is illustrated. Although the dispensers of the invention are generally described herein in relation to cosmetics, the invention is not so limited and may be employed in any field where a dispensing mechanism 650 (i.e., a piston) is employed within a barrel 610 (i.e., a tube, can, bottle, etc.) to distribute a liquid or solid (e.g., powdered) material 612. For example, the invention may be particularly useful in paint, caulking and/or adhesive applications. Accordingly, the barrel 610 may comprise any shape suitable for such uses, and the top and bottom apertures (616b, 616a) may be located as discussed above.

The invention described and claimed herein is not to be limited in scope by the specific embodiments herein disclosed since these embodiments are intended as illustrations of several aspects of this invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All publications cited herein are incorporated by reference in their entirety.

What is claimed:

1. A dispensing apparatus for dispensing a flowable product comprising:
   a barrel defining an interior chamber for holding a flowable product, the barrel having an open bottom at one end thereof and an applicator tip having one or more orifices therethrough at the other end, wherein the barrel is configured to permit passage of air from the interior of the chamber to the exterior of the chamber at a first position substantially abutting a predetermined fill-level and at a second position between said first position and the open bottom of said barrel also configured to permit passage of air from the interior to the exterior of said chamber, wherein the barrel comprises a top aperture at the first position and bottom aperture at the second position, the bottom aperture located closer to the open bottom end of the barrel than the top aperture; and
   a dispensing mechanism disposed within the interior of the barrel between the open bottom and the fill-level, the dispensing mechanism engaging with the interior walls of the barrel to create a liquid-tight seal such that a product disposed in said barrel is prevented from exiting the open bottom,
   wherein, upon insertion of the dispensing mechanism into a product-filled barrel, an amount of air trapped between the dispensing mechanism and said product is forced through the first and second positions, thereby substantially lowering the pressure in the interior chamber of the barrel as compared to an otherwise identical dispensing apparatus having a barrel with one or no passages, to thereby prevent or inhibit said product from being discharged through said one or more applicator orifices in the absence of actuation of the dispensing mechanism.

2. The dispensing apparatus of claim 1, wherein the top and bottom apertures are located a horizontal distance apart.

3. The dispensing apparatus of claim 1, further comprising a complementary, second set of top and bottom apertures.

4. The dispensing apparatus of claim 3, wherein the barrel is cylindrical shaped, and the complementary second set of top and bottom apertures are located about 180° degrees around the circumference of the barrel from the top and bottom apertures.

5. The dispensing apparatus of claim 3, wherein the barrel comprises two or more sides, and the complementary second set of top and bottom apertures are located on an opposite side of the barrel from the top and bottom apertures.

6. The dispensing apparatus of claim 1, wherein the top aperture is located adjacent to the fill-level, and the bottom aperture is located on a snap band on the exterior of the barrel.

7. A dispensing apparatus for dispensing a flowable product comprising:
   a barrel defining an interior chamber for holding a flowable product, the barrel having an open bottom at one end thereof and an applicator tip having one or more orifices therethrough at the other end, wherein the barrel is configured to permit passage of air from the interior of the chamber to the exterior of the chamber at a first position substantially abutting a predetermined fill-level and at a second position between said first position and the open bottom of said barrel also configured to permit passage of air from the interior to the exterior of said chamber, wherein the second position is located on a snap band on the exterior of the barrel; and
   a dispensing mechanism disposed within the interior of the barrel between the open bottom and the fill-level, the dispensing mechanism engaging with the interior walls of the barrel to create a liquid-tight seal such that a product disposed in said barrel is prevented from exiting the open bottom, wherein, upon insertion of the dispensing mechanism into a product-filled barrel, an amount of air trapped between the dispensing mechanism and said product is forced through the first and second positions, thereby substantially lowering the pressure in the interior chamber of the barrel as compared to an otherwise identical dispensing apparatus having a barrel with one or no passages, to thereby prevent or inhibit said product from being discharged through said one or more applicator orifices in the absence of actuation of the dispensing mechanism.

8. A dispensing apparatus for dispensing a flowable product comprising:

a barrel defining an interior chamber for holding a flowable product, the barrel having an open bottom at one end thereof and an applicator tip having one or more orifices therethrough at the other end, wherein the barrel is configured to permit passage of air from the interior of the chamber to the exterior of the chamber at a first position substantially abutting a predetermined fill-level and at a second position between said first position and the open bottom of said barrel also configured to permit passage of air from the interior to the exterior of said chamber, wherein a single aperture extends from the first position to the second position; and a dispensing mechanism disposed within the interior of the barrel between the open bottom and the fill-level, the dispensing mechanism engaging with the interior walls of the barrel to create a liquid-tight seal such that a product disposed in said barrel is prevented from exiting the open bottom, wherein, upon insertion of the dispensing mechanism into a product-filled barrel, an amount of air trapped between the dispensing mechanism and said product is forced through the first and second positions, thereby substantially lowering the pressure in the interior chamber of the barrel as compared to an otherwise identical dispensing apparatus having a barrel with one or no passages, to thereby prevent or inhibit said product from being discharged through said one or more applicator orifices in the absence of actuation of the dispensing mechanism.

9. The dispensing apparatus of claim 8, wherein the barrel is cylindrical shaped, and further comprises a complimentary aperture located about 180° degrees around the circumference of the barrel from the aperture.

* * * * *